United States Patent
Ouellette et al.

(10) Patent No.: US 12,158,763 B2
(45) Date of Patent: Dec. 3, 2024

(54) SYSTEMS AND METHODS FOR USE OF AUTONOMOUS ROBOTS FOR BLIND SPOT COVERAGE

(71) Applicant: Tyco Fire & Security GmbH, Neuhausen am Rheinfall (CH)

(72) Inventors: Jason M. Ouellette, Sterling, MA (US); Kapang Lam, Chelmsford, MA (US); Yufeng Tan, Medford, MA (US); Glenn Holton, Braintree, MA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 17/489,175

(22) Filed: Sep. 29, 2021

(65) Prior Publication Data
US 2023/0100244 A1    Mar. 30, 2023

(51) Int. Cl.
*G05D 1/00*    (2024.01)

(52) U.S. Cl.
CPC .................. *G05D 1/0274* (2013.01)

(58) Field of Classification Search
CPC .. G05D 1/0274; G05D 1/0246; G05D 1/0088; G05D 1/0214; G05D 1/0212; G05D 1/02; G05D 1/0251; G05D 1/0011; G05D 2201/0207; G05D 2201/0209; B25J 19/023; B25J 19/06; B25J 9/1664; B25J 9/16; B25J 11/002; G08B 19/00; G08B 13/19647; G08B 13/19645; G08B 13/19654
See application file for complete search history.

(56) References Cited

U.S. PATENT DOCUMENTS

| | | | |
|---|---|---|---|
| 11,279,480 B1* | 3/2022 | Rezvani | H04W 24/04 |
| 2016/0267759 A1 | 9/2016 | Kerzner | |
| 2018/0329392 A1* | 11/2018 | Li | G06V 20/40 |
| 2018/0348358 A1* | 12/2018 | Anderson | G01S 13/82 |
| 2019/0236374 A1* | 8/2019 | Nakagawa | G06V 20/46 |
| 2019/0387203 A1* | 12/2019 | Sue | H04N 7/185 |
| 2020/0338580 A1* | 10/2020 | Herget | G05D 1/0274 |
| 2021/0048829 A1* | 2/2021 | Deyle | G05D 1/0274 |
| 2021/0073446 A1* | 3/2021 | Levy | G06V 10/235 |
| 2021/0120185 A1* | 4/2021 | Etou | H04N 7/185 |
| 2021/0125369 A1* | 4/2021 | Seyfi | G08B 13/19695 |

FOREIGN PATENT DOCUMENTS

JP    2007179270 A    *    7/2007

OTHER PUBLICATIONS

International Search Report and Written Opinion in PCT/US2022/077208, mailed Jan. 18, 2023, 13 pages.

* cited by examiner

*Primary Examiner* — Khoi H Tran
*Assistant Examiner* — Nhi Q Bui
(74) *Attorney, Agent, or Firm* — ARENTFOX SCHIFF LLP

(57) ABSTRACT

Systems and methods for use of autonomous mobile machine for blind spot coverage may include a security controller that determines a security coverage area based on data from a facility map indicating physical and functional representations of a facility and objects within the facility. The security controller may also determine a surveillance area based on the security coverage area. The security controller may also transmit, to an autonomous mobile machine, instructions for the autonomous mobile machine to deploy to the surveillance area and perform a surveillance task at the surveillance area.

22 Claims, 5 Drawing Sheets

SYSTEMS AND METHODS FOR USE OF AUTONOMOUS ROBOTS FOR BLIND SPOT COVERAGE

TECHNICAL FIELD

The present disclosure relates generally to security systems, and more particularly, to systems and methods for use of an autonomous robots for blind spot coverage.

BACKGROUND

Security systems at facilities include camera devices fixed to walls or ceilings throughout the facilities to monitor areas of interest in the facilities. The security systems may rely on the camera devices to detect safety issues such as unauthorized individuals in the facilities, accidents, smoke/fire issues, and/or other safety issues. However, such camera devices may not provide coverage of all areas of interest in the facilities or may become temporarily or permanently non-functioning.

In view of the foregoing, there is a need for improvements in security systems.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In an aspect, a security system including a memory storing instructions, and one or more processors coupled with the memory, is provided. The security system may be configured to determine a security coverage area of a facility based on data from a facility map indicating physical and functional representations of the facility and objects within the facility. The security system may be configured to determine a surveillance area based on the security coverage area. The security system may be configured to transmit, to an autonomous mobile machine, instructions for the autonomous mobile machine to deploy to the surveillance area and perform a surveillance task at the surveillance area.

In an aspect, a method for using autonomous mobile machines for surveillance coverage by a security system, is provided. The method may include determining a security coverage area of a facility based on data from a facility map indicating physical and functional representations of the facility and objects within the facility. The method may include determining a surveillance area based on the security coverage area. The method may include transmitting, to the autonomous mobile machine, instructions for the autonomous mobile machine to deploy to the surveillance area and perform a surveillance task at the surveillance area.

In another aspect, a computer-readable medium storing computer executable code, is provided. The computer-readable medium may include code to determine a security coverage area of a facility based on data from a facility map indicating physical and functional representations of the facility and objects within the facility. The computer-readable medium may include code to determine a surveillance area based on the security coverage area. The computer-readable medium may include code to transmit, to an autonomous mobile machine, instructions for the autonomous mobile machine to deploy to the surveillance area and perform a surveillance task at the surveillance area.

Further aspects of the present disclosure are described in more details below.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Security systems are often used at public and private facilities, such as commercial buildings, businesses, retail establishments, schools, hospitals and government buildings, to list a few examples. Conventionally, security systems may rely on security cameras placed throughout the facilities to alert security personnel of any security events (e.g., fire, smoke, unauthorized personnel). However, the security cameras may not provide sufficient coverage of all areas, including areas of interest of the facilities, or may temporarily or permanently stop functioning.

Aspects of the present disclosure include systems and methods for using autonomous (e.g., fully autonomous or semi-autonomous) mobile machines (e.g., robot or drone) for blind spot coverage. In an example, a blind spot may include an area interest within a facility that is not covered, or not sufficiently covered (e.g., camera provides low quality image), by a security camera. The security system disclosed herein may determine security coverage areas and non-coverage areas of the facility based on a map (e.g., building information modeling) which includes physical and functional representations of the facility along with objects within the facility. In response to determining the coverage areas and the non-coverage areas, the security system may then determine areas of interest for surveillance by an autonomous mobile machine, and deploying the autonomous mobile machine to one or more of the areas of interest.

Turning now to the figures, example aspects are depicted with reference to one or more components described herein, where components in dashed lines may be optional.

Figure 1:
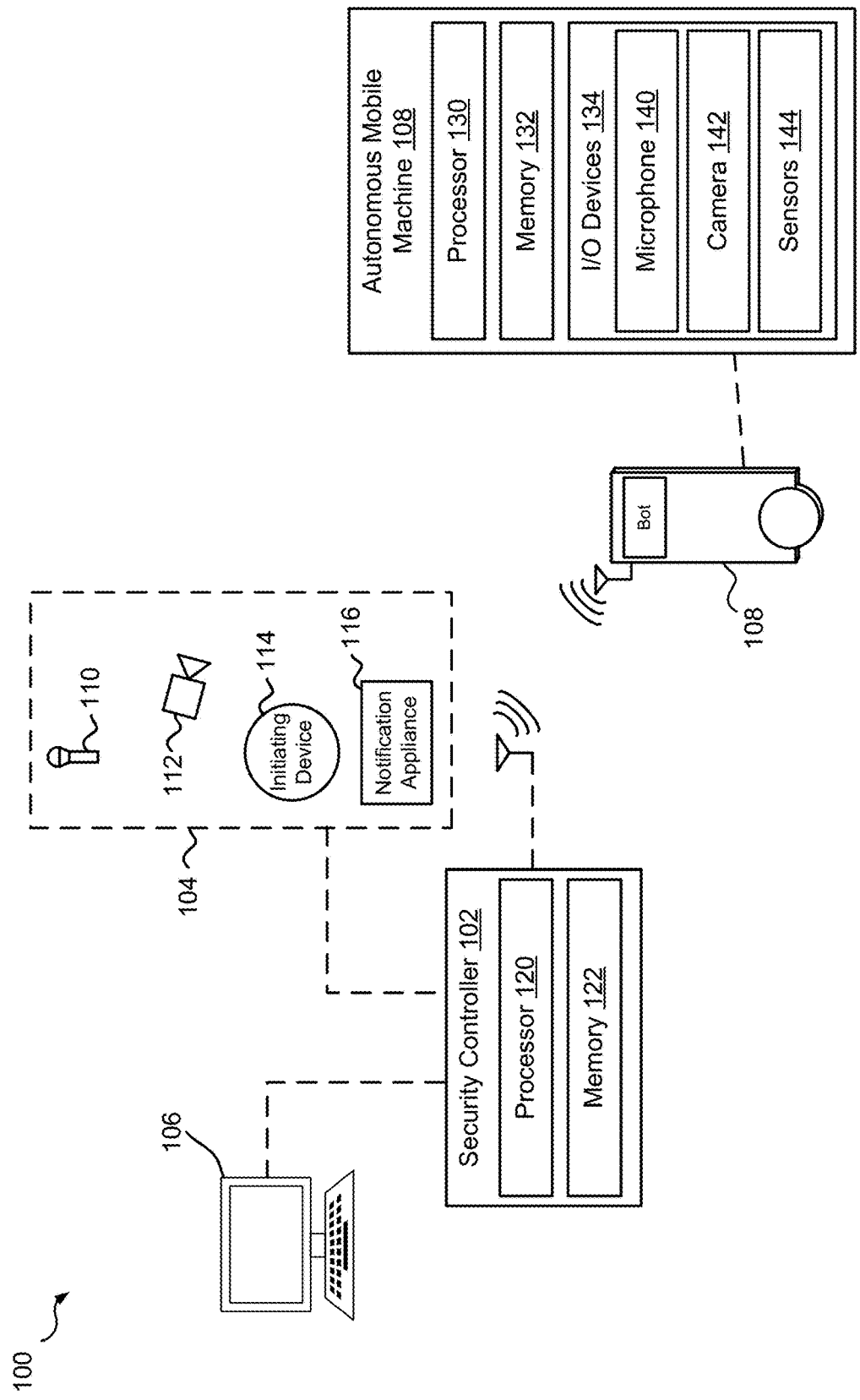
FIG. 1 is a conceptual diagram of an example security system, according to aspects of the present disclosure.

Referring to FIG. 1, an example security system 100 for a facility is depicted. The security system 100 may include a security controller 102 configured to manage security and surveillance functions of the facility. For example, the security controller 102 may communicate with one or more input/output (I/O) devices 104, one or more monitoring stations 106, and/or one or more autonomous mobile machines 108.

The I/O devices 104 may be configured to provide one or more sensor readings or measurements from the facility to the security controller 102 and receive signals for outputting one or more notifications in the facility. Examples of the I/O devices 104 may include, but are not limited to, one or more audio sensors 110 (e.g., microphone), imaging devices 112 (e.g., image or video camera), initiating devices 114 (e.g., fire sensor, smoke sensor, gas sensor, temperature sensor, humidity sensor, or a pull switch), or notification appliances 116 (e.g., alarm or strobe lights).

The security controller 102 may also communicate with the one or more monitoring stations 106. In an example, the security controller 102 may transmit information corresponding to input devices of the I/O devices 104 (e.g., audio/video sample from audio sensor 110/imaging device 112 or signals from initiating devices 114) to a monitoring station 106. Further, the security controller 102 may receive instructions from the monitoring station 106 such as instructions for enabling/disabling the notification appliances 116 or deploying an autonomous mobile machine 108 in response on the information from the input device.

In an aspect, the security controller 102 may include one or more processors 120 coupled with a memory 122. The one or more processors 120 may make security decisions for managing the security system 100 based on one or more instructions and/or rules stored in the memory or based on signals received from the I/O devices 104, the monitoring station 106, or the autonomous mobile machine 108.

The security controller 102 and the I/O devices 104 or the security controller 102 and the monitoring station 106 may communicate through a wired (e.g., fiber optics or cable) link and/or wireless link (e.g., Wi-Fi or cellular). The security controller 102 and the autonomous mobile machine 108 may communicate through a wired (e.g., fiber optics or cable) link when, for example, the autonomous mobile machine 108 is at a docking station (not shown) and/or through a wireless link (e.g., Wi-Fi or cellular) when, for example, the autonomous mobile machine 108 is moving about a facility.

The one or more autonomous mobile machines 108 are capable of moving about the facility to provide security and surveillance functions at different areas and/or stopping points of the facility. In an aspect, the autonomous mobile machine 108 may include one or more processors 130 for controlling the autonomous mobile machine 108 based on instructions received from the security controller 102 or stored in a memory 132 of the autonomous mobile machine 108. In an example, the memory 132 may store data corresponding to a map (e.g., map of physical representations of facility) of the facility.

In an example, the autonomous mobile machine 108 also includes one or more I/O devices 134 such as, but not limited to, an audio sensor (e.g., microphone 140) for capturing audio samples, an imaging device (e.g., image/video camera 142) for capturing images or video samples at one or more areas of the facility, and one or more sensors 144 (e.g., fire sensor, smoke sensor, gas sensor, temperature sensor, or humidity sensor) for capturing environmental conditions at the one or more areas of the facility.

Figure 2:
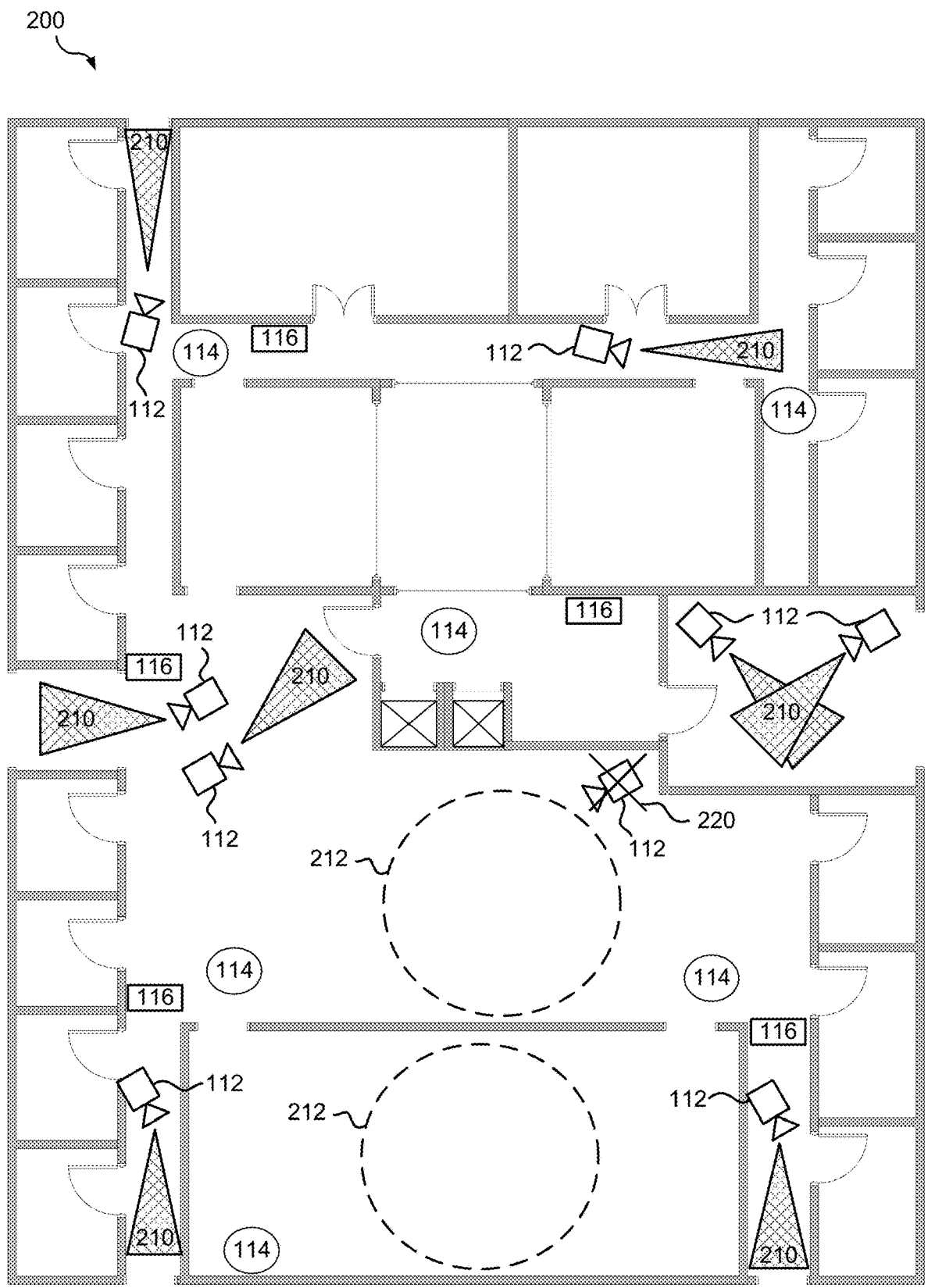
FIG. 2 is a block diagram of an example map used by the security system of FIG. 1, according to aspects of the present disclosure.

Referring to FIG. 2, an example map 200 may be provided to the security controller 102. The map 200 may include physical and functional representations of the facility and objects within the facility. For example, the map 200 may include physical representations of physical structures of the facility, including, but not limited to, hallways, walls, entryways/exits for a facility, a floor, or a room, and/or furniture; physical representations of locations of security devices including, but not limited to, the cameras 112, the initiating devices 114, and/or the notification appliances 116; and the functional representations of the security devices including security coverage areas 210 of the cameras 112. An example of the map 200 may include a building information model (BIM) or any other two or more dimensional map generated to include the physical and functional representations.

In an aspect, the security controller 102 may receive and store, in the memory 122, data for the map 200 of a facility, including physical and functional representations of the facility and objects within the facility. The data may be received by the security controller 102 through any upload means including, but not limited to, a manual upload (e.g., manual connection to a detachable memory device) or an upload through the Internet/intranet. In an example, the security controller 102 may use machine learning or artificial intelligence (AI) to analyze data from the map 200, determine the functional representations of objects, including security coverage areas 210 of the security cameras 112, within the facility. Further, the security controller 102 may determine one or more surveillance areas 212 that need surveillance. Determination of a surveillance area may be based on, for example, an area being a blind spot (e.g., areas not covered by security cameras 112) due to gaps in security coverage areas 210 or due to a fault indication 220 indicating that the signal between the security camera 112 and the security controller 102 is degraded or is lost.

The security controller 102 may transmit instructions to the autonomous mobile machine 108 to be deployed to the surveillance area 212 and perform a surveillance task (e.g., obtain audio/video of the surveillance area 212) at the surveillance area 212.

Figure 3:
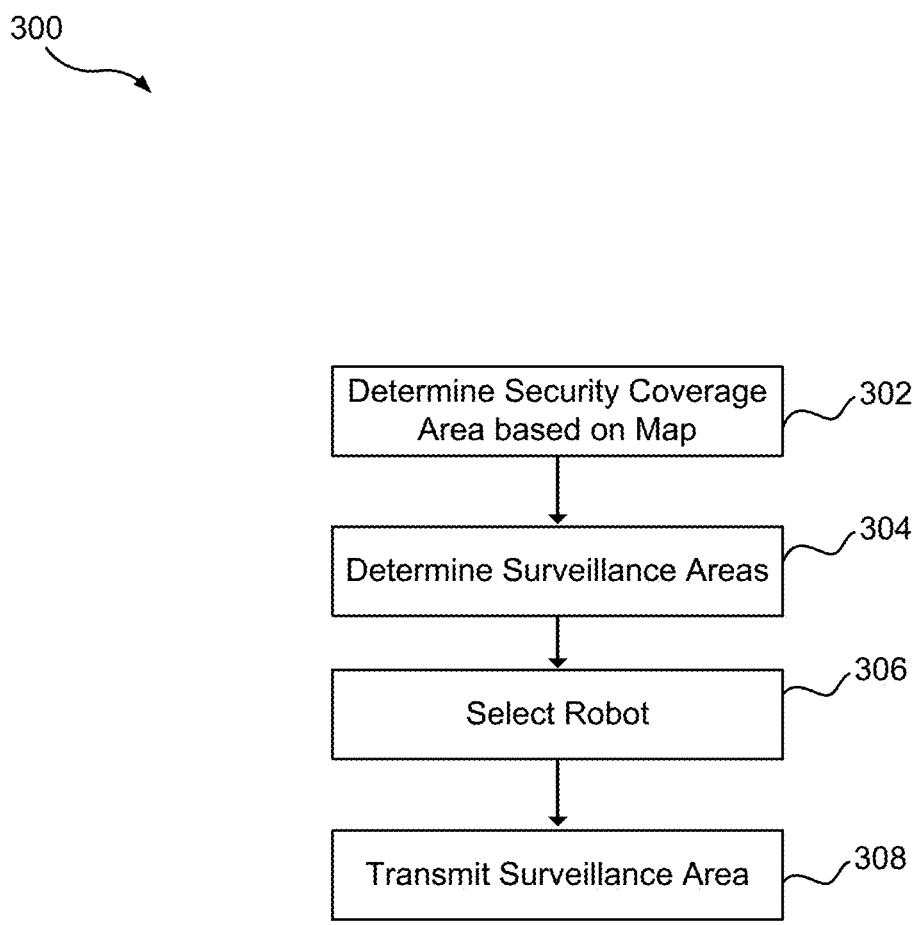
FIG. 3 is a flowchart of an example method implemented by the security system of FIG. 1, according to aspects of the present disclosure.

Referring to FIG. 3, an example method 300 of controlling the security system 100 is depicted. The operations of the method 300 may be performed by one or more components (e.g., security controller 102 of FIG. 1, and/or processor 404, memory 408, memory 410, or communications interface 424 of FIG. 4) of the security system 100, as described herein.

In an aspect, the autonomous mobile machine 108 may receive and store, in the memory 132, data for a physical map of a facility (e.g., physical representations of map 200 of FIG. 2). The data may allow the autonomous mobile machine 108 to know a layout of a facility (e.g., floor or designated area) and determine paths to arrive at different areas of the facility. The data may be received wirelessly by the autonomous mobile machine 108 from the security controller 102 or through other means including, but not limited to, a manual upload (e.g., manual connection to a detachable memory device) or an upload through the Internet/intranet.

At block 302, the security controller 102 may determine a security coverage area 210 of a facility based on data from a facility map indicating physical and functional representations of the facility and objects within the facility. For example, the security controller 102 may determine the security coverage area 210 based on data from the map 200.

At block 304, the security controller 102 may determine a surveillance area based on the security coverage area 210.

For example, by determining the security coverage areas 210 of the security cameras 112, the security controller 102 may also determine areas not covered by of the security cameras 112. Further, the security controller 102 may receive a fault indication from a security camera 112 indicating that the signal between the security camera 112 and the security controller 102 is degraded or lost.

In an aspect, the security controller 102 may determine a plurality of areas 212 need to be under surveillance. Accordingly, the security controller 102 may determine priority levels of the plurality of surveillance areas 212. In an example, each of the plurality of surveillance areas 212 may be scored or weighted based on the need for surveillance in the area, and a surveillance area 212 with a highest score may have the highest priority level. For example, a score for a surveillance area may increase based on: a time since an autonomous mobile machine 108 visited the surveillance area to perform a surveillance task; a location of the surveillance area in comparison to other areas that are being surveilled; a fault signal that needs immediate attention; or any other reason or condition that may increase the need for an area to be surveilled. The priority level may be used by the security controller 102 to determine whether to send the autonomous mobile machine 108 to a surveillance area 212 or the order in which the autonomous mobile machine 108 is deployed to the surveillance areas 212 within the facility.

Based on the priority level, the security controller 102 may generate a queue for deploying the autonomous mobile machine 108 to the surveillance areas 212. For example, the security controller 102 may rank the surveillance areas 212 based on the priority level, where a higher ranked priority level is at the first of the queue. In an example, the security controller 102 may send an autonomous mobile machine 108 to a first surveillance area 212 corresponding to a highest ranked priority level, and once surveillance of the first surveillance area 212 is complete, the security controller 102 may send the autonomous mobile machine 108 to a second surveillance area 212 corresponding to a next highest ranked priority level. Alternatively, once instructions are sent to the autonomous mobile machine 108 to perform surveillance of the first surveillance area 212, the security controller 102 may send instructions to another autonomous mobile machine 108 to surveillance the second surveillance area 212 corresponding to the next highest ranked priority level.

At block 306, the security controller 102 may select an autonomous mobile machine 108 to deploy to the surveillance area 212. In an example, the autonomous mobile machine 108 may be selected based on availability, location, or capabilities of the autonomous mobile machine 108. In an example, security controller may receive a signal from the autonomous mobile machine 108 indicating the availability and/or the location of autonomous mobile machine 108. The signal may be in response to an availability request signal or a location request signal transmitted by the security controller 102.

In an aspect, the security controller 102 may determine capabilities of the autonomous mobile machine 108. In an example, the security controller 102 may store the capabilities of all autonomous mobile machines 108 in memory 122, and based on the capabilities of an autonomous mobile machine 108, select the autonomous mobile machine for deployment. In another example, the security controller 102 may transmit a capabilities request signal to the autonomous mobile machine 108, receive information on the capabilities of the autonomous mobile machine 108 in response, and select the autonomous mobile machine for deployment.

At block 308, the security controller 102 may transmit, to an autonomous mobile machine 108, instructions for the autonomous mobile machine 108 to deploy to the surveillance area 212 and perform a surveillance task at the surveillance area 212. In an example, the surveillance task may include capturing audio/video samples of the surveillance area 212.

Figure 4:
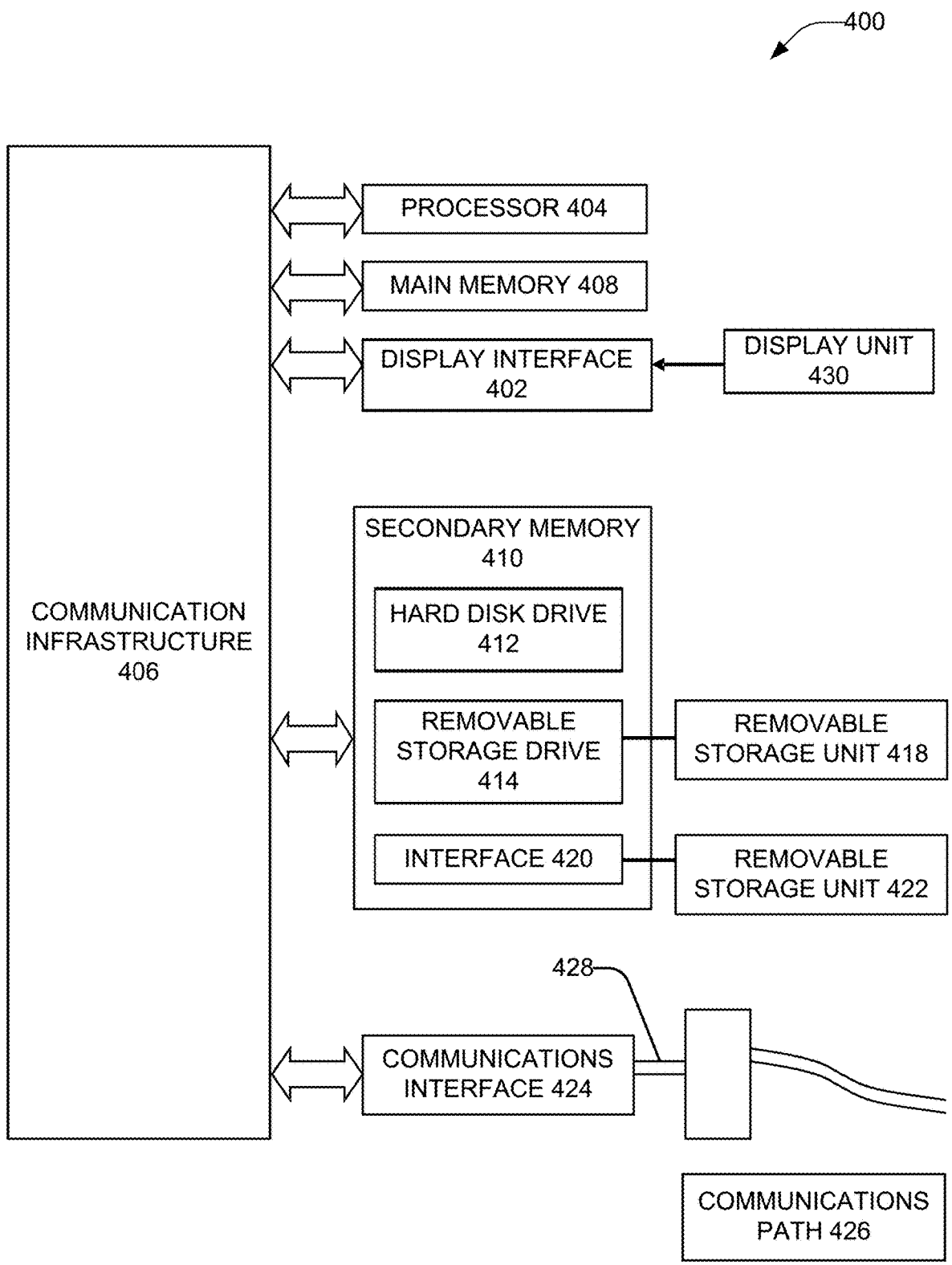
FIG. 4 is a block diagram of the example security control system of FIG. 1 including various hardware components and other features, according to aspects of the present disclosure.

Referring to FIG. 4, an example system 400 is presented with a diagram of various hardware components and other features, for use in accordance with an aspect of the present disclosure. Aspects of the present disclosure may be implemented using hardware, software, or a combination thereof and may be implemented in one or more computer systems or other processing systems. In one example variation, aspects described herein may be directed toward one or more computer systems capable of carrying out the functionality described herein. An example of such a computer system 400 is shown in FIG. 4. In an aspect, the security controller 102 of FIG. 1 may be implemented using the computer system 400.

The computer system 400 may include one or more processors, such as processor 404. The processor 120 may be an example of the processor 404. The processor 404 may be connected to a communication infrastructure 406 (e.g., a communications bus, cross-over bar, or network). Various software aspects are described in terms of this example computer system 400. After reading this description, it will become apparent to an individual skilled in the relevant art(s) how to implement aspects described herein using other computer systems and/or architectures.

The computer system 400 may include a display interface 402 that forwards graphics, text, and other data from the communication infrastructure 406 (or from a frame buffer not shown) for display on a display unit 430. The computer system 400 may also include a main memory 408, e.g., random access memory (RAM), and may also include a secondary memory 410. The secondary memory 410 may include, e.g., a hard disk drive 412 and/or a removable storage drive 414, representing a floppy disk drive, a magnetic tape drive, an optical disk drive, etc. The removable storage drive 414 may read from and/or write to a removable storage unit 418 in a well-known manner. The removable storage unit 418, represents a floppy disk, magnetic tape, optical disk, etc., which is read by and written to the removable storage drive 414. As will be appreciated, the removable storage unit 418 may include a computer usable storage medium having stored therein computer software and/or data. The main memory 408 or the secondary memory 410 may be examples of the memory 122.

In alternative aspects, the secondary memory 410 may include other similar devices for allowing computer programs or other instructions to be loaded into the computer system 400. Such devices may include, e.g., a removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow software and data to be transferred from the removable storage unit 422 to the computer system 400.

The computer system 400 may also include a communications interface 424. The communications interface 424 may allow software and data to be transferred between the computer system 400 and external devices. Examples of the communications interface 424 may include a modem, a network interface (such as an Ethernet card), a communications port, a Personal Computer Memory Card International Association (PCMCIA) slot and card, etc. Software and data transferred via communications interface 424 are in the form of signals 428, which may be electronic, electromagnetic, optical, wireless, or other signals capable of being received by the communications interface 424. These signals 428 are provided to the communications interface 424 via a communications path (e.g., channel) 426. The communications path 426 may carry signals 428 and may be implemented using wire or cable, fiber optics, a telephone line, a cellular link, a radio frequency (RF) link and/or other communications channels. The terms "computer program medium," "computer usable medium," "computer readable medium," or "non-transitory computer readable medium" may be used to refer generally to media such as a removable storage drive, a hard disk installed in a hard disk drive, and/or signals 428. These computer program products provide software to the computer system 400. Aspects described herein may be directed to such computer program products.

Computer programs (also referred to as computer control logic or applications may be stored in the main memory 408 and/or the secondary memory 410. The computer programs may also be received via the communications interface 424. Such computer programs, when executed, enable the computer system 400 to perform various features in accordance with aspects described herein. In particular, the computer programs, when executed, enable the processor 404 to perform such features. Accordingly, such computer programs represent controllers of the computer system 400. The computer programs may include instructions or code for executing methods described herein.

In variations where aspects described herein are implemented using software, the software may be stored in a computer program product and loaded into the computer system 400 using the removable storage drive 414, the hard disk drive 412, or the interface 420. The control logic (software), when executed by the processor 404, causes the processor 404 to perform the functions in accordance with aspects described herein. In another variation, aspects are implemented primarily in hardware using, e.g., hardware components, such as application specific integrated circuits (ASICs). Implementation of the hardware state machine so as to perform the functions described herein will be apparent to individuals skilled in the relevant art(s).

In yet another example variation, aspects described herein are implemented using a combination of both hardware and software.

Figure 5:
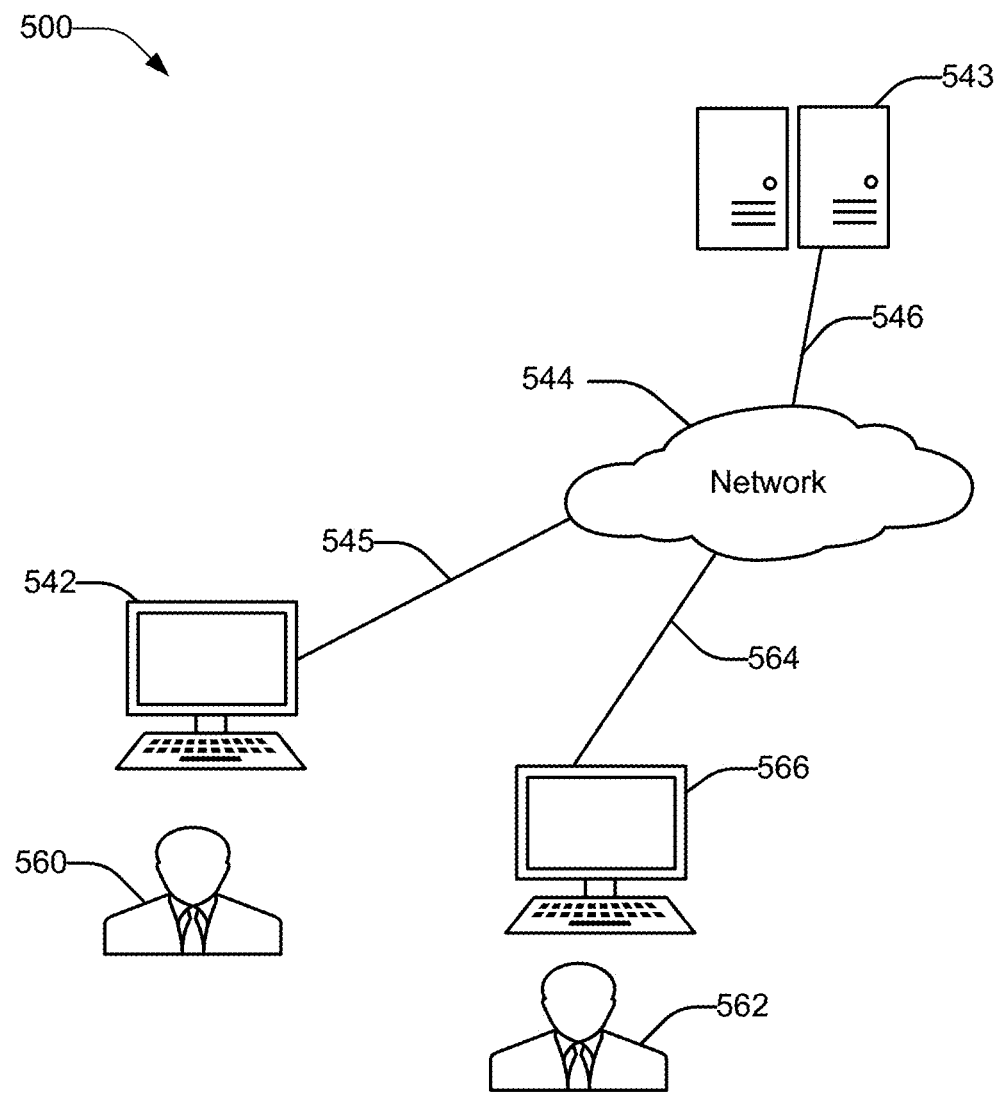
FIG. 5 is a block diagram of various example system components of the security system of FIG. 1, according to aspects of the present disclosure.

FIG. 5 is a block diagram of various example system components. FIG. 5 shows a communication system 500 including one or more users 560, 562 and one or more terminals 542, 566. The terminals 542, 566 may include the security controller 102 or the monitoring station 106 of FIG. 1 or the computer system 400 of FIG. 4 or a related system or subsystem, and/or the like. In one aspect, data for use in accordance with aspects described herein may be input and/or accessed by the users 560, 562 via the terminals 542, 566, such as personal computers (PCs), minicomputers, mainframe computers, microcomputers, telephonic devices, or wireless devices, such as personal digital assistants ("PDAs") or a hand-held wireless devices coupled to a server 543, such as a PC, minicomputer, mainframe computer, microcomputer, or other device having a processor and a repository for data and/or connection to a repository for data, via, a network 544 for instance, such as the Internet or an intranet, and couplings 545, 546, 564. The couplings 545, 546, 564 may include wired, wireless, or fiber optic links. In another example variation, the method and system in accordance with aspects described herein operate in a stand-alone environment, such as on a single terminal.

The previous description is provided to enable any individual skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A security system, comprising:
an autonomous mobile machine;
a server configured to connect to the autonomous mobile machine and having
a memory storing instructions; and
one or more processors coupled with the memory and configured to execute the instructions to:
determine a security coverage area of a facility based on data determined via machine learning analysis of a facility map of the facility, the data indicating physical and functional representations of the facility and objects including physical representations of locations of security devices within the facility;
receive a fault indication corresponding to a security camera of the security system;
determine a surveillance area that is not within the security coverage area based on the security coverage area, wherein the surveillance area is further based on a location of the security camera corresponding to the fault indication in the facility and a capability of the security camera corresponding to the fault indication in the facility;

determine a respective one of a plurality of priority levels weighed based on a need for surveillance in the surveillance area, wherein a score for a need for surveillance in the surveillance area increases with increasing time since an autonomous mobile machine last visited the surveillance area to perform a surveillance task; and transmit, to the autonomous mobile machine, the respective one of the plurality of priority levels and instructions for the autonomous mobile machine to deploy to the surveillance area and perform the surveillance task at the surveillance area, wherein the autonomous mobile machine is configured to deploy to the surveillance area and perform the surveillance task responsive to the instructions and the respective one of the plurality of priority levels.

2. The security system of claim 1, wherein the data from the facility map is based on a building information model (BIM).

3. The security system of claim 1, wherein the surveillance task includes capturing audio/video samples of the surveillance area.

4. The security system of claim 3, wherein the fault indication indicates one or more of a degraded signal or a lost signal from the security camera.

5. The security system of claim 1, wherein the one or more processors is further configured to execute the instructions to:

determine a plurality of surveillance areas including the surveillance area; and determine, from among the plurality of priority levels, respective priority levels of the plurality of surveillance areas, wherein the surveillance area is determined further based on the respective priority levels.

6. The security system of claim 5, wherein the one or more processors is further configured to execute the instructions to:

generate a queue to send the autonomous mobile machine to the plurality of surveillance areas based on the priority levels, wherein the surveillance area is determined further based on the queue.

7. The security system of claim 1, wherein the one or more processors is further configured to execute the instructions to:

determine capabilities of the autonomous mobile machine; and select the autonomous mobile machine from a plurality of autonomous mobile machines based on the capabilities, wherein the instructions are transmitted to the autonomous mobile machine in response to the autonomous mobile machine being selected.

8. A method for using autonomous mobile machines for surveillance coverage by a security system, comprising:

determining a security coverage area of a facility based on data determined via machine learning analysis of a facility map of the facility, the data indicating physical and functional representations of the facility and objects including physical representations of locations of security devices within the facility;

receiving a fault indication corresponding to a security camera of the security system;

determining a surveillance area that is not within the security coverage area based on the security coverage area, wherein the surveillance area is further based on a location of the security camera corresponding to the fault indication in the facility and a capability of the security camera corresponding to the fault indication in the facility;

determining a respective one of a plurality of priority levels weighed based on a need for surveillance in the surveillance area, wherein a score for a need for surveillance in the surveillance area increases with increasing time since an autonomous mobile machine last visited the surveillance area to perform a surveillance task;

transmitting, to the autonomous mobile machine, the respective one of the plurality of priority levels and instructions for the autonomous mobile machine to deploy to the surveillance area and perform the surveillance task at the surveillance area; and wherein the autonomous mobile machine deploys to the surveillance area and performs the surveillance task responsive to the instructions and the respective one of the plurality of priority levels.

9. The method of claim 8, wherein the data from the facility map is based on a building information model (BIM).

10. The method of claim 8, wherein the surveillance task includes capturing audio/video samples of the surveillance area.

11. The method of claim 10, wherein the fault indication indicates one or more of a degraded signal or a lost signal from the security camera.

12. The method of claim 8, further comprising:

determining a plurality of surveillance areas including the surveillance area; and determining, from among the plurality of priority levels, respective priority levels of the plurality of surveillance areas, wherein the surveillance area is determined further based on the respective priority levels.

13. The method of claim 12, further comprising:

generating a queue to send the autonomous mobile machine to the plurality of surveillance areas based on the priority levels, wherein the surveillance area is determined further based on the queue.

14. The method of claim 8, further comprising:

determining capabilities of the autonomous mobile machine; and selecting the autonomous mobile machine from a plurality of autonomous mobile machines based on the capabilities, wherein the instructions are transmitted to the autonomous mobile machine in response to the autonomous mobile machine being selected.

15. One or more non-transitory computer readable mediums storing computer executable code, comprising code to:

determine a security coverage area of a security system for a facility based on data determined via machine learning analysis of a facility map of the facility, the data indicating physical and functional representations of the facility and objects including physical representations of locations of security devices within the facility;

receive a fault indication corresponding to a security camera of the security system;

determine a surveillance area that is not within the security coverage area based on the security coverage area, wherein the surveillance area is further based on a location of the security camera corresponding to the fault indication in the facility and a capability of the security camera corresponding to the fault indication in the facility;

determine a respective one of a plurality of priority levels weighed based on a need for surveillance in the surveillance area, wherein a score for a need for surveillance in the surveillance area increases with increasing time since an autonomous mobile machine last visited the surveillance area to perform a surveillance task;

transmit, to the autonomous mobile machine, the respective one of the plurality of priority levels and instructions for the autonomous mobile machine to deploy to the surveillance area and perform the surveillance task at the surveillance area; and wherein the autonomous mobile machine deploys to the surveillance area and performs the surveillance task responsive to the instructions and the respective one of the plurality of priority levels.

16. The one or more non-transitory computer-readable mediums of claim 15, wherein the data from the facility map is based on a building information model (BIM).

17. The one or more non-transitory computer-readable mediums of claim 15, wherein the surveillance task includes capturing audio/video samples of the surveillance area.

18. The one or more non-transitory computer-readable mediums of claim 17, wherein the fault indication indicates one or more of a degraded signal or a lost signal from the security camera.

19. The one or more non-transitory computer-readable mediums of claim 15, further comprising code to:

determine a plurality of surveillance areas including the surveillance area; and determine, from among the plurality of priority levels, respective priority levels of the plurality of surveillance areas, wherein the surveillance area is determined further based on the respective priority levels.

20. The one or more non-transitory computer-readable mediums of claim 19, further comprising code to:

generate a queue to send the autonomous mobile machine to the plurality of surveillance areas based on the priority levels, wherein the surveillance area is determined further based on the queue.

21. The one or more non-transitory computer-readable mediums of claim 15, further comprising code to:

determine capabilities of the autonomous mobile machine; and select, via a security controller, the autonomous mobile machine from a plurality of autonomous mobile machines based on the capabilities, wherein the instructions are transmitted to the autonomous mobile machine in response to the autonomous mobile machine being selected.

22. The security system of claim 1, wherein the one or more processors are further configured to determine whether or not to deploy the autonomous mobile machine based on the respective one of the plurality of priority levels.

* * * * *